(12) United States Patent
Heise et al.

(10) Patent No.: US 8,082,086 B2
(45) Date of Patent: Dec. 20, 2011

(54) TRAILER VEHICLE BRAKE-CONTROL MODULE

(75) Inventors: Bernd Heise, Garbsen (DE); Rainer Risse, Pattensen-Reden (DE); Axel Stender, Hameln (DE); Norbert Witte, Lauenau (DE)

(73) Assignee: WABCO GmbH, Hannover (DE)

( * ) Notice: Subject to any disclaimer, the term of this patent is extended or adjusted under 35 U.S.C. 154(b) by 562 days.

(21) Appl. No.: 12/291,499

(22) Filed: Nov. 10, 2008

(65) Prior Publication Data

US 2009/0120747 A1    May 14, 2009

(30) Foreign Application Priority Data

Nov. 14, 2007 (DE) .......................... 10 2007 054 189

(51) Int. Cl.
*B60D 1/62* (2006.01)
*B60T 13/74* (2006.01)
*G06G 7/00* (2006.01)

(52) U.S. Cl. ............. 701/70; 188/3 R; 280/422; 701/81

(58) Field of Classification Search ............. 188/1.11 E, 188/1.11 R, 3 R; 280/422, 427, 428; 340/453, 340/454; 701/70, 71, 76, 77, 81
See application file for complete search history.

(56) References Cited

U.S. PATENT DOCUMENTS

| | | | | |
|---|---|---|---|---|
| 5,397,924 A | * | 3/1995 | Gee et al. | 307/9.1 |
| 5,677,667 A | * | 10/1997 | Lesesky et al. | 340/431 |
| 5,693,985 A | * | 12/1997 | Gee et al. | 307/9.1 |
| 6,970,772 B2 | * | 11/2005 | Radtke et al. | 701/1 |
| 7,497,529 B2 | * | 3/2009 | Lesesky et al. | 303/123 |
| 2006/0192427 A1 | * | 8/2006 | Lesesky et al. | 303/122 |
| 2010/0207744 A1 | * | 8/2010 | Lammers et al. | 340/310.11 |

FOREIGN PATENT DOCUMENTS

| | | |
|---|---|---|
| DE | 103 57 373 A1 | 7/2005 |
| EP | 1 757 506 A1 | 2/2007 |

* cited by examiner

*Primary Examiner* — Tony H. Winner
*Assistant Examiner* — Marc Scharich
(74) *Attorney, Agent, or Firm* — Kramer Levin Naftalis & Frankel LLP

(57) ABSTRACT

A brake-control module for a first trailer of a tractor-trailer combination reduces braking response time for the second trailer and subsequent trailers in the vehicle train. The brake-control module includes a tractor interface. The tractor interface includes a tractor CAN interface for connecting to a tractor CAN connector of a tractor, a tractor voltage-supply interface for connecting to a tractor voltage-supply connector of the tractor, and a tractor warning-light interface for connecting to a tractor warning-light connector of the tractor. The brake-control module further includes a second-trailer interface for connection of a second trailer that is coupled to the first trailer. The second-trailer interface includes a second-trailer CAN interface for connecting to a second-trailer CAN connector of the second trailer, a second-trailer voltage-supply interface for connecting to a voltage connector of the second trailer, and a second-trailer warning-light interface for connecting to a second-trailer warning-light connector of the second trailer.

10 Claims, 1 Drawing Sheet

TRAILER VEHICLE BRAKE-CONTROL MODULE

FIELD OF THE INVENTION

The present invention generally relates to a new trailer brake-control module for tractor-trailer vehicle combinations.

BACKGROUND OF THE INVENTION

In conventional tractor-trailer combinations having multiple pneumatically braked trailers, the braking response of the braking systems of the second and subsequent trailers is considerably slower than the braking response of the braking system of the first trailer (i.e., the trailer coupled to the tractor). This is due to the length of the pneumatic lines employed. Thus, there is a need for a trailer brake-control module that improves (reduces) the braking response time for the second trailer and any subsequent trailers (the second and any subsequent trailers will be referred to generally hereinafter as "second" trailer).

SUMMARY OF THE INVENTION

Generally speaking, in accordance with the present invention, a new trailer brake-control module is provided which satisfies the above-identified need.

The trailer brake-control module in accordance with a preferred embodiment of the present invention includes a tractor interface. The tractor interface comprises (i) a tractor Controller Area Network ("CAN") interface for connecting to a CAN connector of a tractor, (ii) a tractor voltage-supply interface for connecting to a voltage-supply connector of the tractor and (iii) a tractor warning-light interface for connecting to a warning-light connector of the tractor. The brake-control module also includes a second-trailer interface for connecting a second trailer coupled to the first trailer. The second-trailer interface comprises (i) a second-trailer CAN interface for connecting to a CAN connector of the second trailer, (ii) a second-trailer voltage-supply interface for connecting to a voltage connector of the second trailer and (iii) a second-trailer warning-light interface for connecting to a warning-light connector of the second trailer.

It will be appreciated that the voltage-supply interfaces are optional. Also, the warning-light interfaces are optional.

The brake-control module in accordance with a preferred embodiment of the present invention can control the braking system of the first trailer which is coupled to the tractor by means of a CAN data bus (or other suitable data bus) and can supply the first trailer's braking system with electrical energy. That is, the inventive brake-control module is constructed and arranged to receive, from the tractor via the tractor CAN interface, signals that encode the control commands for the braking system. In addition, the inventive brake-control module can activate braking of the first trailer such that the encoded braking maneuver is executed (it can also control a warning light of the first trailer).

The brake-control module according to a preferred embodiment of the present invention also can deliver CAN data to the CAN interface of the second trailer, in which case the CAN data encode those commands received via the tractor CAN interface. In this way, the inventive brake-control module is used not only to activate the braking system of the first trailer but also as a relay for the second trailer.

It should be understood that the term "trailer" denotes one possible and particularly favorable application for the inventive brake-control module. As an example, the first trailer and/or the second trailer may be a dolly or a bogie.

Accordingly, it is an object of the present invention to provide a new (first) trailer brake-control module for improving the braking behavior of a tractor-trailer vehicle train (e.g., a EuroCombi) by enabling the relay of braking activation commands in the form of electrical signals from the tractor to all attached (second) trailers.

Still other objects and advantages of the present invention will in part be obvious and will in part be apparent from the specification.

The present invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
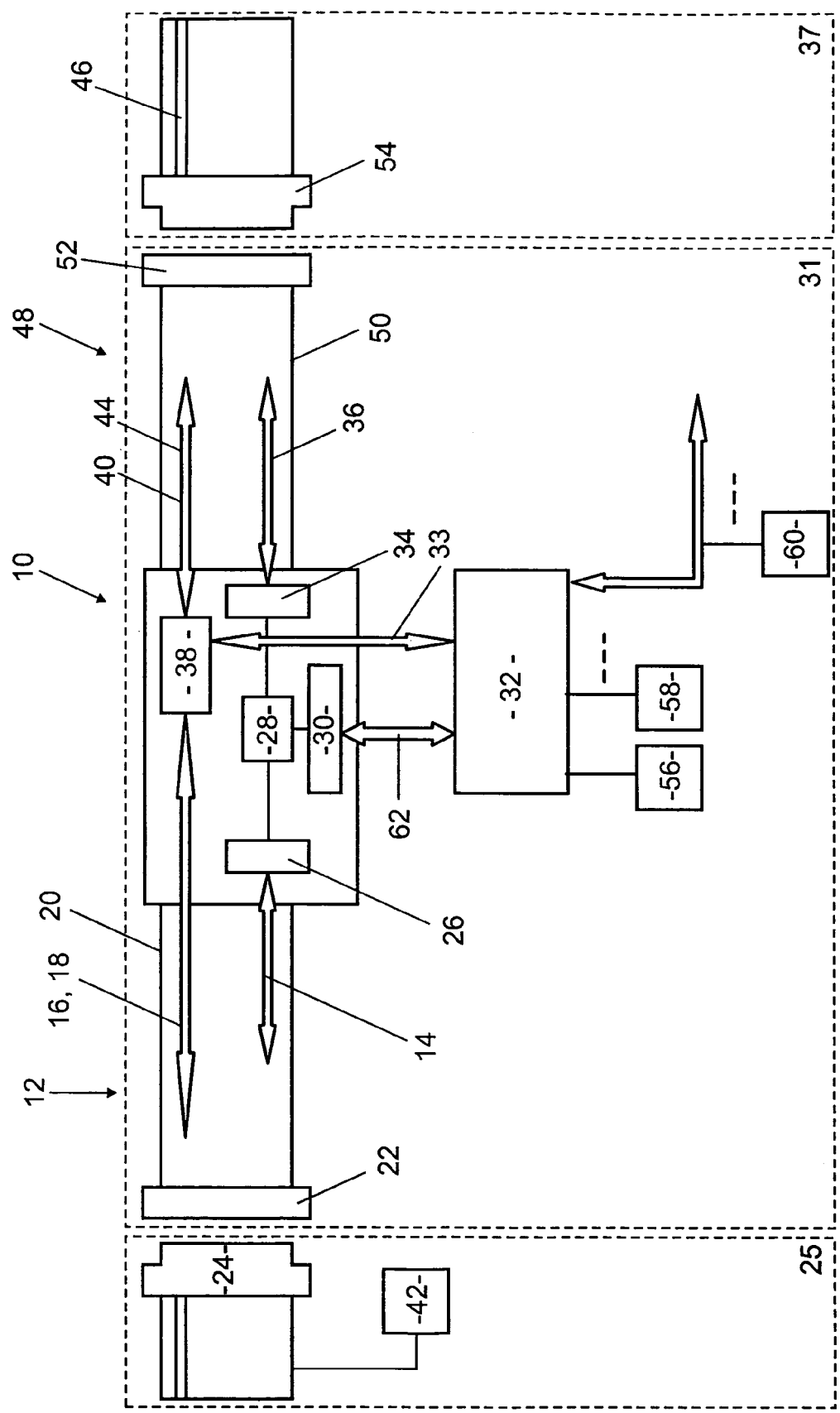
FIG. 1 is a schematic view of a trailer brake-control module according to a preferred embodiment of the present invention.

FIG. 1 depicts a trailer brake-control module 10 for a tractor-trailer combination according to a preferred embodiment of the present invention. Brake-control module 10, which is preferably provided in a first trailer 31 coupled to the tractor 25 of the tractor-trailer combination (schematically depicted in FIG. 1), includes an interface 12, which comprises a tractor CAN interface 14 and a combined interface, which, in turn, unites a tractor voltage-supply interface 16 and a tractor warning-light interface 18. The interfaces transport voltage or electrical signals on individual cables (not illustrated) and are grouped together in a tractor connecting cable 20, which ends in a tractor plug connector 22. Tractor plug connector 22 is designed to cooperate with a tractor connecting socket 24, which is fastened to the tractor 25.

Desirably, CAN interface 14 is a 24-V CAN interface. As an alternative or an addition thereto, one or two 5-V CAN interfaces can be employed.

Via tractor connecting cable 20, brake-control module 10 receives electrical energy, a control signal that encodes the commands to activate the warning light, and electrical signals on a CAN data bus. The tractor CAN interface is connected via a decoding unit 26 to an electronic controller 28, which is programmed to activate a first-trailer braking system 32 of the first trailer 31 via a driver 30.

Electronic controller 28 is programmed to output, via an encoding unit 34, to a second-trailer CAN interface 36, those commands that have been received via tractor CAN interface 14. Controller 28 can also check all incoming commands on the CAN data bus and determine whether they are intended for a second trailer 37 (schematically depicted in FIG. 1) of the tractor-trailer combination, in which case only these commands are relayed to the second trailer.

The voltage present at tractor voltage-supply interface 16 is relayed by a logic unit 38 directly to a second-trailer voltage-supply interface 40. The signals received via a second-trailer warning-light interface 44 are logically combined with the signals received by first-trailer braking system 32 via a brake-system warning-light interface 33 and are relayed via tractor warning-light interface 18 to tractor 25 for activation of a warning light 42.

Desirably, the voltage supply to the second trailer 37 and to the first-trailer braking system 32 is protected against electrical overload.

The warning-light control commands arriving through tractor warning-light interface 18 and corresponding to those for the tractor are amplified, if necessary, and communicated via second-trailer warning-light interface 44 to a second-trailer warning-light connector 46. Second-trailer voltage-supply interface 40, second-trailer warning-light interface 44 and second-trailer CAN interface 36 are combined in a second-trailer interface 48. Electric cables in a second-trailer connecting cable 50 provide a connection to a second-trailer plug connector 52. An electric connection between brake-control module 10 and second trailer 37 is established via a second-trailer connecting socket 54, so that the data passing over the interfaces or the voltages present there can be transmitted to the second trailer. The CAN interfaces are preferably 24-V CAN interfaces.

First-trailer braking system 32 is in electrical contact with an axle-load sensor 56, a brake-lining wear sensor 58 and a tire-pressure monitoring system 60. Data collected by these sensors are delivered via a data line 62 and via driver 30, which simultaneously functions as the decoding unit for these data, to controller 28. In turn, controller 28 sends these data via the decoding unit, which can also be designated as driver 26 and which simultaneously functions as the encoding unit, and via the tractor CAN interface to the tractor.

Second trailer 37 includes a brake-control module, which is identical to the brake-control module shown in FIG. 1. In addition, the second trailer also includes axle-load sensors, brake-lining wear sensors and a tire-pressure monitoring system. The data collected by these sensors are relayed to the tractor via the electronic controller of the brake-control module in the second trailer, which controller corresponds to electric controller 28, and via second-trailer CAN interface 36, electric controller 28 and tractor CAN interface 14. In this way, sensor data of all trailers are always present in the tractor.

Connection of the tractor interface to the tractor via a single tractor plug connector provides a brake-control module that is particularly easy to operate. The inventive brake-control module is particularly maintenance-free when the tractor plug connector is connected by means of a single tractor connecting cable. In this way, only a plug connection for activation of the braking system need be established in addition to the mechanical coupling of the first trailer and tractor or the second trailer and first trailer.

To save space, it is preferred that the first-trailer braking system and the inventive brake-control module be combined as one unit.

Accordingly, the present invention improves braking behavior. Because the inventive brake-control module includes a CAN interface for the second trailer, even the second trailer can be braked via an electrical index value. As a result, the brakes respond more rapidly in the second trailer, and the braking deceleration is increased at the beginning of the braking operation.

Another advantage of the present invention is its flexibility. More particularly, the inventive trailer brake-control module can relay activation commands of the tractor to the second trailer. In principle, any number of trailers can be attached one after the other, and all can be braked by electrical signals delivered via the CAN (or like) bus.

A further advantage of the present invention is that trailers can be combined as desired. Trailers equipped with the inventive trailer brake-control module can be used both as first trailers and as second trailers.

Yet another advantage of the present invention is that information on the condition of the second trailer is also available in the tractor. For example, information on the wear condition of the brake lining, on the tires and/or on the load of the second trailer can be sent via the first trailer to the tractor by means of the CAN (or like) bus.

A still further advantage is the simple logical connection of all interfaces of trailers and the tractor.

It will thus be seen that the objects set forth above, among those made apparent from the preceding description, are efficiently attained and, since certain changes may be made in the constructions set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A brake-control module for a first trailer of a tractor-trailer combination, comprising:
    a tractor interface, including:
        a tractor CAN interface for connection to a tractor CAN connector of a tractor of the tractor-trailer combination coupled to the first trailer;
        a tractor voltage-supply interface for connection to a tractor voltage-supply connector of the tractor; and
        a tractor warning-light interface for connection to a tractor warning-light connector of the tractor; and
    a second-trailer interface, comprising:
        a second-trailer CAN interface for connection to a second-trailer CAN connector of a second trailer of said tractor-trailer combination coupled to the first trailer;
        a second-trailer voltage-supply interface for connection to a voltage connector of the second trailer; and
        a second-trailer warning-light interface for connection to a second-trailer warning-light connector of the second trailer.

2. The brake-control module according to claim 1, wherein the first trailer further comprises:
    a braking system; and
    a CAN data bus configured to control the braking system and deliver electrical energy to the braking system.

3. The brake-control module according to claim 2, wherein voltage supply to the second trailer and the braking system is protected against overload.

4. The brake-control module according to claim 1, further comprising means for delivering CAN data to the second-trailer CAN interface, the CAN data including encoded commands received via the tractor CAN interface.

5. The brake-control module according to claim 1, wherein the tractor interface further comprises a single plug connector configured to enable connection of the tractor interface to the tractor via a single connecting cable.

6. The brake-control module according to claim 1, wherein the second-trailer interface further comprises a single plug connector configured to enable connection of the second-trailer interface to the second trailer via a single connecting cable.

7. The brake-control module according to claim 1, wherein each of the tractor CAN interface and the second-trailer CAN interface is a 24-V CAN interface.

8. The brake-control module according to claim 2, further comprising an integrated braking system for the first trailer.

9. A vehicle trailer, comprising a brake-control module according to claim 1.

10. A vehicle, comprising:

a tractor;

a first trailer coupled to said the tractor; and a second trailer coupled to the first trailer, at least one of the first trailer and the second trailer including a brake-control module according to claim 1.

\* \* \* \* \*